Figure 1A:
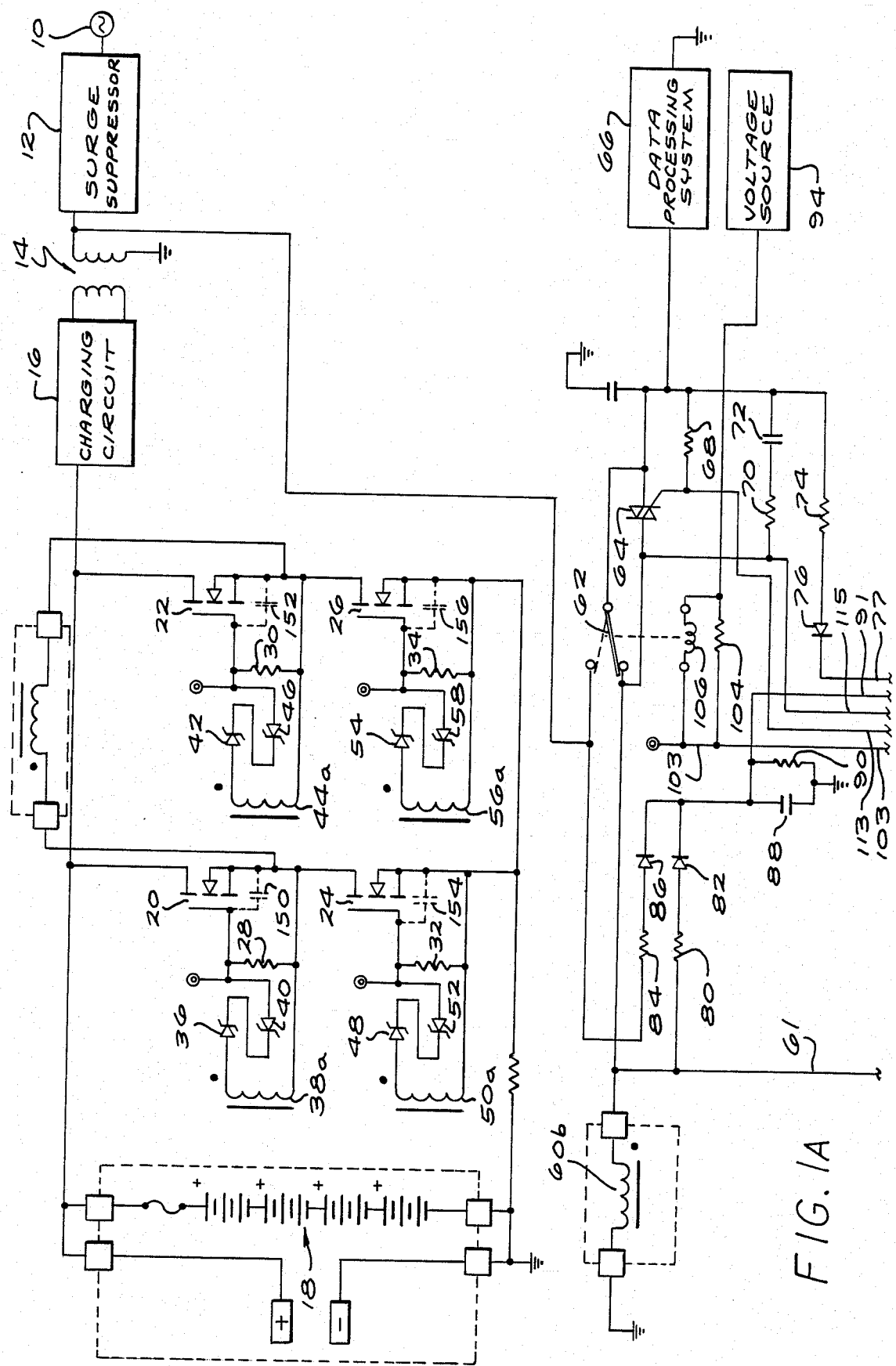

United States Patent [19]

Gronskog et al.

[11] Patent Number: 4,823,019

[45] Date of Patent: Apr. 18, 1989

[54] STAND-BY POWER SYSTEM

[75] Inventors: Lennart A. Gronskog; Timothy P. McGrath, both of San Diego, Calif.

[73] Assignee: Computer Accessories Corporation, San Diego, Calif.

[21] Appl. No.: 222,219

[22] Filed: Jul. 21, 1988

[51] Int. Cl.$^4$ .............................................. H02H 3/28
[52] U.S. Cl. ....................................... 307/66; 307/64; 365/229
[58] Field of Search .................... 307/64, 66, 85, 84, 307/86, 85; 365/226, 227, 228, 229

[56] References Cited

U.S. PATENT DOCUMENTS

| | | | |
|---|---|---|---|
| 3,859,638 | 1/1975 | Hume | 365/229 |
| 4,669,066 | 5/1987 | Kagawa et al. | 365/229 |
| 4,703,191 | 10/1987 | Ferguson | 307/64 |

Primary Examiner—Bernard Roskoski
Assistant Examiner—Paul Ip
Attorney, Agent, or Firm—Ellsworth R. Roston; Charles H. Schwartz

[57] ABSTRACT

Main power (e.g. an alternating voltage) is applied to a data processing system through a switch in a first state of the switch operation. The switch may have an arm movable to a first terminal to obtain the first state of switch operation and to a second terminal to obtain a second state of switch operation. A microprocessor periodically checks to determine if the main power to the data processing system has been interrupted. Upon such an interruption, the microprocessor produces a signal which causes the switch to be transferred to the second state of operation. The microprocessor is also operative to cause an alternating voltage to be produced during the interruption in the application of the main power to the data processing system. This alternating voltage is introduced to the data processing system in the second state of operation of the switch to energize the data processing system. During the transition of the switch between the first and second states of operation, the microprocessor is also operative to by-pass the switch so as to obtain the introduction of the alternating voltage directly to the data processing system. The switch may be by-passed by energizing an electrooptical coupler from the microprocessor and by energizing a triac from the voltage produced when the electrooptical coupler is energized.

22 Claims, 2 Drawing Sheets

STAND-BY POWER SYSTEM

This invention relates to apparatus for introducing standby power to a data processing system when the main power to the data processing system is interrupted. More particularly, the invention relates to a system for introducing such standby power to a data processing system even during the time that the operation of a switch respectively controlling the introduction of the main power and the standby power to the data processing system in first and second states of operation is being converted between such first and second states.

The use of digital computers and data processing systems (these terms being used interchangeably in the specification and the claims) has become practically universal. Such computers and data processing systems have a profound effect in the operation of businesses, large and small. Such computers and data processing systems are also used by individuals for purposes of business and pleasure. All of such systems employ memories to store information resulting from, and providing for, the processing of data by such systems.

Although digital computers and data processing systems have many advantages, there are also a few disadvantages associated with their use. For example, when the introduction of power for energizing such computers and data processing systems becomes interrupted, such computers and data processing systems often lose information stored in memories and information being processed in the computers during such interruptions. When power is subsequently restored to such computers and data processing systems, such computers and data processing systems may thereafter process incorrect information. This is particularly true when there is no awareness that the introduction of the main power to the computers and data processing systems has been interrupted.

To prevent information from being lost in a computer or data processing system and to prevent the subsequent processing of incorrect information in such system, apparatus has been provided and is in use for introducing standby power to a computer or data processing system when the main power to the computer or data processing system has been interrupted. These systems are relatively slow and inefficient in converting between the main power and the standby power. As a result, there is a significant time hiatus between the interruption of the main power to the computer or data processing system and the introduction of the standby power to such computer and data processing system. During this hiatus, valuable information can be lost in the computer and data processing system.

The problem of retaining information in a computer or data processing system upon an interruption in the main power to the computer has been aggravated because the speed of processing data in the computer or data processing system has been progressively increased. Thus, although the response time of apparatus for introducing standby power to a computer or data processing system may have progressively increased through the years, this has been at least offset by the increased speed at which the data processing system process data. Furthermore, any loss of data by any interruption in the introduction of power to a computer or data processing system has been exacerbated by the considerable increases in the size of the computers and data processing systems and by the resultant increase in the amount of data being processed by such computers and data processing systems at any instant.

A considerable effort has been made, and a significant amount of money has been expended, for many years to perfect apparatus for introducing standby power instantaneously to a computer or data processing system when the main power to such computer or data processing system becomes interrupted. In spite of such efforts and such expenditure of money, an acute problem still exists in expeditiously introducing standby power to a computer or data processing system when the main power to the computer or data processing system becomes interrupted.

This invention provides apparatus for overcoming the disadvantages discussed above. The apparatus includes a switch which is operative in a first state to provide for the introduction of the main power to the computer or data processing system. The apparatus is also operative in a second state, upon an interruption in the application of the main power to the computer or data processing system, to provide for the introduction of standby power to the computer or data processing system. The apparatus also provides for the introduction of the standby power to the computer or data processing system during the time that the switch is being transferred between the first and second states of operation.

In one embodiment of the invention, main power (e.g. an alternating voltage) is applied to a data processing system through a switch in a first state of the switch operation. The switch may have an arm movable to a first terminal to obtain the first state of switch operation and to a second terminal to obtain the second state of switch operation. A microprocessor periodically checks to determine if the main power to the data processing system has been interrupted. Upon such an interruption, the microprocessor produces a signal which causes the switch to be transferred to the second state of operation.

The microprocessor is also operative to cause an alternating voltage to be produced during the interruption in the application of the main power to the data processing system. This alternating voltage is also introduced to the data processing system in the second state of operation of the switch to energize the data processing system.

During the transition of the switch between the first and second states of operation, the microprocessor is operative to by-pass the switch so as to obtain the introduction of the alternating voltage directly to the data processing system. The switch may be by-passed by energizing an electrooptical coupler from the microprocessor and by energizing a triac from the voltage produced when the electrooptical coupler is energized.

Figure 1B:
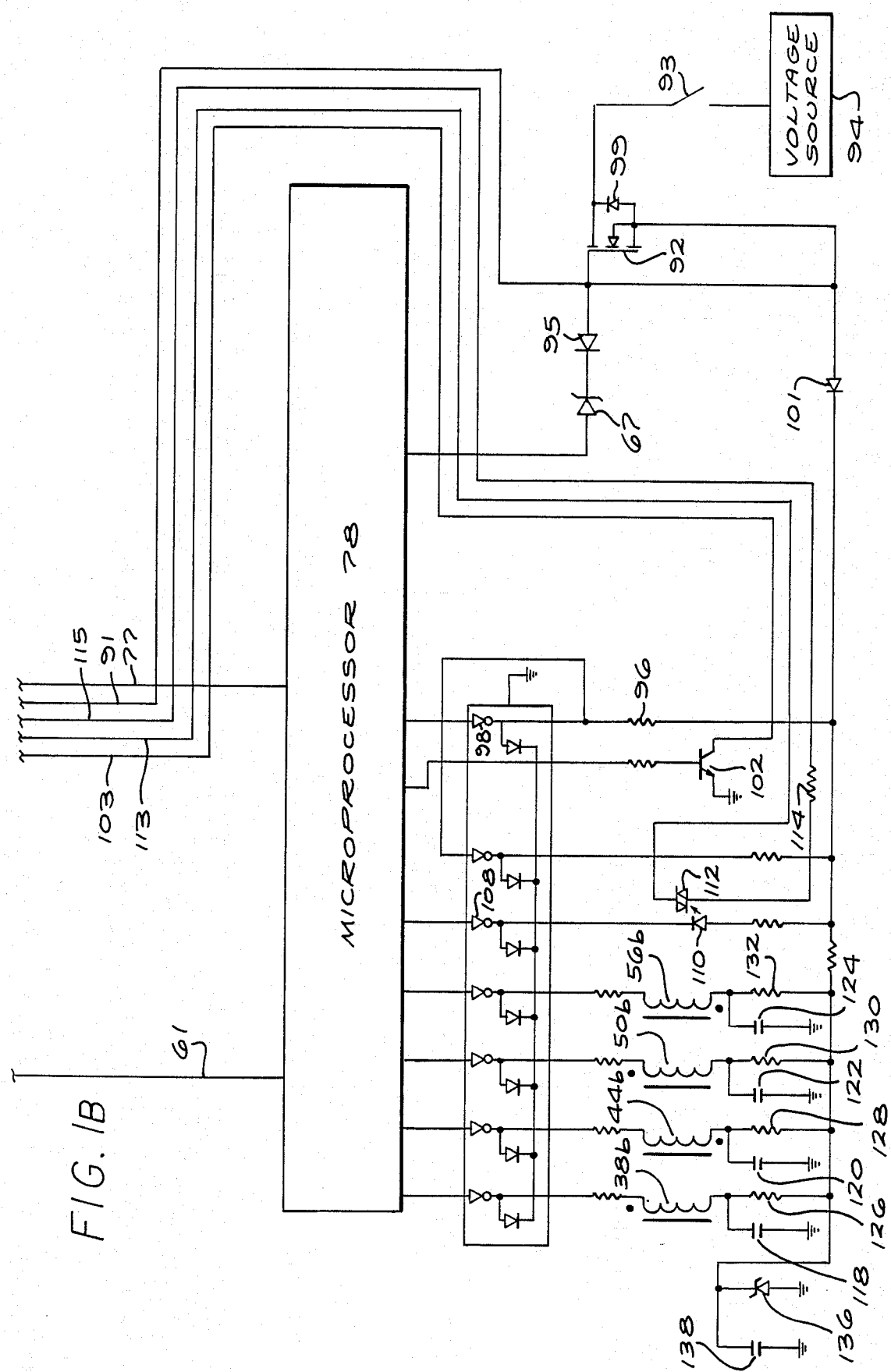

In the drawings:

FIGS. 1A and 1B jointly constitute a circuit diagram, partly in block form, of apparatus constituting one embodiment of the invention.

In one embodiment of the invention, a source 10 (FIG. 1A) of alternating voltage at a suitable frequency such as approximately sixty (60) hertz is provided. The source 10 may be provided by a wall outlet. The alternating voltage from the source 10 may be introduced to a surge suppressor 12 which operates in a conventional manner to reduce surges in voltage from the source. The alternating voltage is then introduced to one terminal of the primary winding of a transformer generally indicated at 14, the other terminal of the primary winding being grounded. The secondary winding of the transformer 14 is connected to a charging circuit 16 which may be constructed in a conventional manner. The output terminal of the charging circuit 16 is connected to an ungrounded terminal of a battery 18, the other terminal of which is grounded. The charging circuit 16 maintains the battery 18 at a suitable voltage such as twenty four volts (24V.).

The ungrounded terminal of the battery 18 is connected to the drains of field effect transistors 20 and 22 and the grounded terminal of the battery 18 is connected to the sources of field effect transistors 24 and 26. The source of the field effect transistor 20 and the drain of the field effect transistor 24 are common as are the source of the field effect transistor 22 and the drain of the field effect transistor 26. Resistors 28, 30, 32 and 34 are respectively connected between the sources and gates of the field effect transistors 20, 22, 24 and 26.

A zener diode 36, a winding 38a and a zener diode 40 are in series across the resistance 28. Similarly, a zener diode 42, a winding 44a and a zener diode 46 are in series across the resistance 30; a zener diode 48, a winding 50a and a zener diode 52 are in series across the resistance 32; and a zener diode 54, a winding 56a and a zener diode 58 are in series across the resistance 34.

A winding 60a is a connected between the sources of the diodes 20 and 22. The winding 60a is magnetically coupled to a winding 60b, one terminal of which is grounded. The other terminal of the winding 60b is connected through a line 61 (FIGS. 1A and 1B) to a microprocessor 78 (FIG. 1B). The other terminal of the winding 60b is also connected to the lower stationary terminal of a switch 62. The upper stationary terminal of the switch 62 has a common connection with the ungrounded terminal in the primary winding of the transformer 14.

The movable arm of the switch 62 is common with the output terminal of a triac 64 and with a data processing system 66. The triac 64 has two input terminals, one connected to one terminal of a resistance 68 and the other connected to one terminal of a resistance 70. A capacitance 72 in series with the resistance 70 is connected to the second terminal of the resistance 68 and to one terminal of a resistance 74. The other terminal of the resistance 74 is common with the anode of a diode 76. The cathode of the diode 76 is common through a line 77 (FIGS. 1A and 1B) with the microprocessor 78 in FIG. 1B. The ungrounded terminal of the winding 60b is also connected in FIG. 1a to one terminal of a resistance 80, the second terminal of which is common with the anode of a diode 82. A resistance 84 and a diode 86 have similar connections between the ungrounded terminal of the primary winding in the transformer 14 and the cathode of the diode 82. A capacitance 88 and a resistance 90 are in parallel between the cathodes of the diodes 82 and 86 and ground.

The cathodes of the diodes 82 and 86 are also common through a line 91 (FIGS. 1A and 1B) with the gate of a field effect transistor 92. The gate of the field effect transistor 92 is also connected to the anode of a diode 95, the cathode of which is common with one terminal of a zener diode 97. The other terminal of the zener diode 97 is connected to the microprocessor 78. The source of the transistor 92 receives a positive potential through a master switch 93 from a voltage source 94. The anode and cathode of a diode 99 are respectively common with the drain an source of the transistor 92.

The anode of the diode 95 (FIG. 1B) is connected to the anode of a diode 101. The cathode of the diode 101 common with one terminal of a resistance 96. The second terminal of the resistance 96 receives signals from an amplifier-inverter 98 connected to the microprocessor 78. Another output terminal of the microprocessor 78 is common with one terminal of a switch such as the gate of an npn transistor 102. The emitter of the transistor 102 is grounded and the collector of the transistor is common through a line 103 (FIGS. 1A and 1B) with one terminal of a resistor 104 and one terminal of a relay 106 (FIG. 1A). The second terminals of the resistance 104 and the relay 106 receive a positive voltage from the voltage source 94. The relay 106 is magnetically coupled to the movable arm of the switch 62.

The input terminal of an amplifier-inverter 108 (FIG. 1B) is also connected to the microprocessor 78 and the output terminal of the amplifier-inverter is connected to the cathode of a diode 110 having its anode common with the cathode of the diode 101. The diode 110 is included in an optical coupler with a silicon-controlled rectifier 112 having one terminal connected through a line 113 (FIGS. 1A and 1B) to one input terminal of the triac 64 (FIG. 1A) and having another terminal connected to one terminal of a resistance 114. The other terminal of the resistance 114 is connected through a line 115 (FIGS. 1A and 1B) to the other terminal of the triac 64.

Alternating voltages are introduced from the microprocessor 78 (FIG. 1B) to first terminals of windings 38b, 44b, 50b and 56b. Ther windings 38b, 44b, 50b and 56b respectively form transformers with the windings 38a, 44b, 50b and 56b. The polarities of these windings are respectively indicated by dots at the top or bottom of the windings. Thus, the windings 38b and 50b provide alternating voltages of one polarity and the windings 44b and 56b provide alternating voltages of an opposite polarity.

Capacitances 118, 120, 122 and 124 are respectively connected between the windings 38b, 44b, 50b and 56b and ground. First terminals of resistances 126, 128, 130 and 132 are also respectively connected to the windings 38b, 44b, 50b and 56b. The second terminals of the resistances 126, 128, 130 and 132 have a common connection with the ungrounded terminals of a zener diode 136 and a capacitance 138. The second terminals of the zener diode 136 and the capacitance 138 are grounded.

The alternating voltage from the source 10 (FIG. 1A) is regulated by the surge suppressor 12 and is introduced to the transformer 14. The output from the transformer 14 is introduced to the charging circuit 16 which converts the alternating voltage to a direct voltage. This direct voltage is introduced to the battery 18 to insures that the battery remains fully charged. In this way, the battery 18 is always ready to provide stand-by power to the data processing system 66 if the power from the source 10 becomes interrupted.

During the time that alternating voltage is being provided by the source 10, a voltage is introduced from the primary winding of the transformer 14 to the upper stationary terminal of the switch 62. During this time, the upper stationary terminal of the switch 62 is engaged by the movable arm of the switch. This causes the alternating voltage from the source 10 to be supplied to the data processing system 66 through the switch 62.

The voltage on the ungrounded terminal of the winding 60b 14 passes through the line 61 in FIGS. 1A and 1B to the microprocessor 78. The microprocessor 68 periodically checks this voltage to determine if it is receiving the voltage. This check may occur approximately every five hundred microseconds (500 sec.). It may sometimes occur that the alternating voltage from the voltage source 10 may temporarily become interrupted. When this occurs, the microprocessor 78 becomes immediately aware of this because of the periodic check by the microprocessor.

When the voltage from the winding 60b becomes interrupted, the microprocessor 78 (FIG. 1B) introduces a voltage to the transistor 102 to make the transistor conductive. Current accordingly flows through a circuit including the voltage source 94 (FIG. 1A), the relay 106, the line 103 in FIGS. 1A and 1B and the transistor 102 (FIG. 1B). This current energizes the relay 106, thereby causing the movable arm of the switch 62 to move from engagement with the upper stationary terminal of the switch to engagement with the lower stationary terminal of the switch. An alternating voltage is accordingly introduced from the winding 60b through the switch 62 to the data processing system 66 to maintain the operation of the system.

Although the movement of the arm in the switch 62 from engagement with the upper stantionary terminal to engagement with the lower stationary terminal is almost instantaneous, it still requires a finite time to occur. During this time, valuable information may be lost in the data processing system 66. This may cause all processing of data thereafter to be inaccurate. What is worse, the inaccuracies may become compounded with time. This is particularly true when the data processing system 66 processes data at a high speed.

This invention provides stages for insuring that the data processing system 66 will continue to be energized during the time that the movable arm of the switch 62 is moving between the upper and lower stationary terminals of the switch. During this interval of time, the microprocessor 78 produces a voltage which causes the diode 110 (FIG. 1B) to be energized through a circuit including the voltage source 94, the master switch 93, the field effect transistor 92, the diode 111 and the diode 110.

When the diode 110 becomes energized, it produces light which is optically coupled instantaneously to the silicon control rectifier 112. The silicon control rectifier 112 is constructed to provide a low impedance instantaneously and a voltage when it receives light from the diode 110. This voltage is introduced between the input terminals of the triac 64 through the lines 113 and 115 in FIGS. 1A and 1B in a direction to provide a low impedance between the output terminal of the triac and the input terminal connected to the lower stationary terminal of the switch 62. Current accordingly flows through a circuit including the winding 60b, the triac 64 and the data processing system 66. This circuit by-passes the switch 62 to provide for an instantaneous energizing of the data processing system 66 during the time that the movable arm of the switch 62 is moving between the upper and lower stationary terminals of the switch.

When the alternating voltage from the source 10 is interrupted, an alternating voltage is produced instantaneously in the transformer defined by the windings 60a and 60b. This alternating voltage is produced in the windings 60a and 60b by the action of the microprocessor 78 in producing a flow of current through the windings 38b and 50b in positive half cycles of an alternating voltage from the microprocessor and through the windings 44b and 56b in negative half cycles of the alternating voltage from the microprocessor. The voltages produced in the windings 38b and 50b and the windings 44b and 56b are respectively induced in the windings 38a and 50a and the windings 44a and 56a.

The windings 38a, 44a, 56a and 56a are energized by the battery 18. For example, current may flow from the battery 18 through a circuit including the source and drain of the field effect transistor 20 and the source and drain of the field effect transistor 24 during the time that the gates of the transistors are positive. Positive voltages are produced on the gates of the transistors during the time that the upper terminals of the windings 38a and 38b and the windings 50a and 50b are positive, as indicated by dots at the upper terminals of the windings.

A distributed capacitance effectively exists between the source and the gate of each of the field effect transistors 20, 22, 24 and 26. These distributed capacitances are respectively illustrated in broken lines at 150, 152, 154 and 154 for the transistors 20, 22, 24 and 26. Thus, during the time that the transistors 20 and 24 are conductive, the distributed capacitances 150 and 154 become charged. For example, the distributed capacitance 150 becomes charged through a circuit including the winding 38a, the zener diode 36, the distributed capacitance 150 and the zener diode 40 when the voltage on the upper terminal of the winding is positive. The flow of current to charge the distributed capacitance 150 is limited by the zener diode 40.

In the negative half cycles of the voltages in the windings 38a and 50a, the charges in the distributed capacitances 150 and 154 become discharged. For example, the distributed capacitance 150 becomes discharged through a circuit including the zener diode 40, the zener diode 36 and the winding acts to insure that the field effect 38a. This discharge transistors 20 and 24 will not be conductive during the negative half cycles of the alternating voltage.

In like manner, the transistors 22 and 26 become conductive during the negative half cycles of voltage. The distributed capacitances 152 and 156 accordingly become charged during the negative half cycles of voltage and become discharged during the positive half cycles of voltages. The discharges of the capacitances 152 and 156 act to insure that the transistors 22 and 26 will not become conductive during the positive half cycles of voltage.

The capacitances 118, 120, 122 and 124 (FIG. 1B) also act to insure that currents will flow through the field effect transistors 20 and 24 in the positive half cycles and will be prevented from flowing through the transistors in the negative half cycles. This results from the charge produced in the capacitances 118 and 122 in the positive half cycles. These charges are respectively discharged through the resistances 126 and 130 and the zener diode 136 in the negative half cycles. In this way, the capacitances 118 and 122 become charged through the windings 38b and 50b in one direction in the positive half cycles and become discharged in the negative half cycles.

The respective discharge of the capacitances 118 and 122 in the negative half cycles produces a positive voltage on the lower terminals of the transistors 38b and 50b to insure that the field effect transistors will not be conductive during the negative half cycles. Similarly, the capacitances 120 and 124 become charged during the negative half cycles of the voltage and become discharged during the positive half cycles of the voltage.

During the positive half cycles of the voltage, current flows through a circuit including the battery 12, the field effect transistor 20, the winding 60a and the field effect transistor 26. In the negative half cycles of the voltage, current flows through a circuit including the battery 12, the field effect transistor 22, the winding 60a and the transistor 24. As will be seen, the current flows in opposite directions through the winding 60a in the positive and negative half cycles of the voltage. This causes an alternating voltage to be produced in the winding 60a.

The alternating voltage in the winding 60a is induced in the winding 60b. This voltage is introduced through the switch 62 to the data processing system 66 when the movable arm of the switch is moved from engagement with the upper stationary terminal of the switch to engagement with the lower stationary terminal of the switch. The introduction of the alternating voltage to the data processing system 66 by-passes the switch 62 and is through the triac 64 during the time that the movable arm of the switch 62 is moving from engagement with the upper stationary terminal of the switch to engagement with the lower stationary of the switch.

The system described above has certain important advantages. It senses instantaneously when the main power to the data processing system from the source 10 has been interrupted. It provides immediately for the introduction of auxiliary power from the battery 18 to the data processing system 66 after conversion of this auxiliary power to an alternating voltage. The system provides for the introduction of this auxiliary power to the data processing system 66 even during the time that the switch 62 is being converted from one state of operation to the other. In this way, the data processing system 66 is able to continue to operate without any interruption in power and without the loss of any data.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In combination for providing standby power to a data processing system when the main power to the data processing system is interrupted,
    microprocessor means for detecting when the main power to the data processing system is interrupted,
    relay means,
    first means responsive to he interruption in the main power to the data processing system to become energized,
    switching means having first and second states of operation and normally operative in the first state and responsive to the energizing of the relay means to become operative in the second state,
    second means responsive to the operation of the switching means in the second state to introduce the standby power to the data processing means, and
    third means responsive to the interruption in the main power to the data processing system for introducing the standby power to the data processing means during the conversion of the switching means from the first state to the second state.

2. In a combination as set forth in claim 1,
    the third means including electrooptical means for producing a signal instantaneously after the switching means. starts to change from the first state of operation to the second state of operation and means responsive to the signal from the electrooptical means for introducing the standby power to the data processing means.

3. In a combination as set forth in claim 2,
    the second means including means operatively coupled to the microprocessor means for producing signals of alternating polarity and the second means introducing the signals of the alternating polarity to the data processing means with the operation of the switching means in the second state, and
    the third means introducing the signals of the alternating polarity to the data processing means during the conversion of the switching means from the first state to the second state.

4. In a combination as set forth in claim 1,
    the second means including bridge means responsive to the operation of the microprocessor means for producing signals of alternating polarity, and
    the second means introducing the signals of the alternating polarity to the data processing means with the operation of the switching means in the second state, and
    the third means introducing the signals of the alternating polarity to the data processing means during the conversion of the switching means from the first state to the second state.

5. In a combination as set forth in claim 1,
    means for introducing the main power to the data processing means with the switching means in the first state of operation.

6. In combination for providing standby power to a data processing system when the main power to the data processing system is interrupted,
    relay means,
    switching means having first and second states of operation and normally operative in the first state and operable to the second state and having a finite time for the change in the operation between the first and second states,
    microprocessor means for periodically testing to determine if the main power is being applied to the data processing means,
    first means operatively coupled to the microprocessor means for producing a voltage of alternating polarity,
    second means for applying the main power to the data processing means during the operation of the switching means in the first state,
    third means responsive to the operation of the microprocessor means for obtaining an operation of the switching means in the second state when the application of the main power to the data processing means becomes interrupted,
    fourth means responsive to the operation of the switching means in the second state for providing for the application of the voltage of the alternating polarity to the data processing means, and
    fifth means operative during the finite time for the change in the operation of the switching means between the first and second states for providing for the application of the voltage of the alternating polarity to the data processing means.

7. In a combination as set forth in claim 6, wherein the switching means is mechanical and the fifth means includes electrooptical means operative when the main power to the microprocessor means is interrupted to produce a signal and means responsive to the signal from the electrooptical means for applying the voltage of the alternating polarity to the data processing means.

8. In a combination as set forth in claim 6 wherein the fifth means includes electrooptical means operatively coupled to the microprocessor means for producing a signal when the main power to the microprocessor means is interrupted and wherein means are responsive to the signal from the electro optical means for by-passing the switching means, for the application of the alternating voltage directly to the data processing means, during the finite time that the operation of the switching means is changing between the first and second states.

9. In a combination as set forth in claim 8, wherein the first means includes bridge means having first and second legs connected to each other and third and fourth legs connected to each other and each leg includes a and a transistor responsive to the signals from the microprocessor means for producing the alternating voltage at the connections between the first and second legs and the connections between the third and fourth legs.

10. In combination for providing standby power to a data processing system when the main power to the data processing system is interrupted, microprocessor means for providing periodic determinations of any interruption in the application of the main power to the data processing means, switching means having first and second states of operation and normally operative in the first state, means for introducing the main power to the data processing means in the first state of operation of the switching means, means responsive to the periodic determinations by the microprocessor means for producing a voltage of alternating polarity during any interruption in the application of the main power to the data processing means, means responsive to the periodic determinations by the microprocessor means for producing a change in the operation of the switching means from the first state to the second state when the main power to the data processing means is interrupted, means responsive to the operation of the switching means in the second state for introducing the voltage of the alternating polarity to the data processing means, means responsive to the determinations by the data processing means for by-passing the switching means during the change in the state of operation of the switching means between the first and second states of operation, and means operatively coupled to the by-passing means for providing for the introduction of the alternating voltage to the data processing means during such by-passing.

11. In a combination as set forth in claim 10, the by-passing means including electrooptical means operatively coupled to the microprocessor means for producing a particular voltage during the interruption in the application of the main power to the data processing means and further includes control means responsive to the particular voltage from the electrooptical means for providing for the introduction of the voltage of alternating polarity to the data processing means.

12. In a combination as set forth in claim 11, the switching means having first and second stationary terminals and an arm movable to engage the first and second terminals and being operative in the first state with the movable arm in engagement with the first terminal and being operative in the second state with the movable arm in engagement with the second terminal, the second terminal and the movable arm of the switching means being connected across the control means to short the control means when the movable arm engages the second terminal.

13. In a combination as set forth in claim 12, the control means having first, second and third terminals, the electrooptical means being connected between the first and second terminals of the control means and the third terminal of the control means being connected to the data processing means.

14. In a combination as set forth in claim 12, the movable arm of the switching means being connected to the third terminal of the control means and the second terminal of the switching means being connected to the second terminal of the control means.

15. In combination for providing standby power to a data processing system when the main power to the data processing system is interrupted, microprocessor means operative periodically to test whether the main power to the data processing system has been interrupted, switching means having first and second states of operation and normally operative in the first state, first means responsive to the determination by the microprocessor means of the interruption in the main power to the data processing means for producing a change in the state of operation of the switching means from the first state to the second state, second means responsive to the determination by the data processing means of the interruption in the main power to the data processing system for obtaining the production of an alternating voltage, and third means responsive to the determination by the microprocessor means of the interruption in the main power to the microprocessor means for obtaining the introduction of the alternating voltage to the data processing system during the change in the operation of the switching means between the first and second states.

16. In a combination as et forth in claim 15, means for providing for the introduction of an alternating voltage to the data processing system during the first state of operation of the switching means to provide the main power to the data processing system.

17. In a combination as set forth in claim 16, the third means including means for by-passing the switching means in the introduction of the alternating voltage from the second means to the data processing system during the change in the state of operation of the switching means between the first and second states.

18. In a combination as set forth in claim 17, the third means including electrooptical means responsive to the determination by the microprocessor means of the interruption in the application of the main power to the data processing system for producing a signal, the switching means including a relay energizable to obtain a change in the operation of the switching means from the first state to the second state, and the second means including a switch responsive to the determination of the interruption in the application of the main power to the data processing system to become conductive and further including circuitry including the relay and the switch for energizing the relay when the transistor becomes conductive.

19. In combination for use with a data processing system, first means for providing an alternating voltage, switching means having first and second states of operation and normally operative in the first state, second means for introducing the alternating voltage to the data processing system through the switch in the first state of operation of the switch to provide power to the data processing system to operate the data processing system, microprocessor means responsive to the alternating voltage for periodically checking such voltage to determine if the main power is being introduced to the data processing system and for indicating when the introduction of the main power to the data processing system is interrupted, third means responsive to the indication by the microprocessor means of the interruption in the voltage for obtaining an operation of the switch to the second state, an auxiliary source of energy, fourth means responsive to the operation of the switch in the second state for introducing energy from the auxiliary source to the data processing system, and fifth means operation during the conversion of the switch between the first and second states of operation for introducing energy from the auxiliary source to the data processing system during such conversion.

20. In a combination as set forth in claim 19, the auxiliary source constituting a battery, and means responsive to the alternating voltage for charging the battery.

21. In a combination as set forth in claim 20, means responsive to the voltage from the auxiliary source and the operation of the microprocessor means for producing an auxiliary alternating voltage, the fourth means being responsive to the auxiliary alternating voltage for introducing the auxiliary alternating voltage to the data processing system to energize the data processing system during the operation of the switch in the second state, and the fifth means being responsive to the auxiliary alternating voltage for introducing the auxiliary alternating voltage to the data processing system during the conversion in the operation of the switching means between the first and second states.

22. In a combination as set forth in claim 19, the fifth means being operative to by-pass the switching means during the conversion in the operation of the switching means between the first and second states of operation.

* * * * *